(12) United States Patent
Fechtel (10) Patent No.: US 7,756,225 B2
(45) Date of Patent: Jul. 13, 2010

(54) DEVICE AND METHOD FOR PREAMBLE DETECTION AND FRAME SYNCHRONIZATION IN DATA PACKET TRANSMISSION

(75) Inventor: Stefan Fechtel, Zorneding (DE)

(73) Assignee: Infineon Technologies AG, Neubiberg (DE)

( * ) Notice: Subject to any disclaimer, the term of this patent is extended or adjusted under 35 U.S.C. 154(b) by 811 days.

(21) Appl. No.: 11/561,962

(22) Filed: Nov. 21, 2006

(65) Prior Publication Data

US 2007/0153761 A1 Jul. 5, 2007

Related U.S. Application Data

(63) Continuation of application No. PCT/DE2005/000870, filed on May 11, 2005.

(30) Foreign Application Priority Data

May 21, 2004 (DE) ........................ 10 2004 025 109

(51) Int. Cl.
*H03D 1/00* (2006.01)
(52) U.S. Cl. ................... 375/343; 375/142; 370/311
(58) Field of Classification Search ............ 375/142, 375/147, 365, 150, 152, 145, 143
See application file for complete search history.

(56) References Cited

U.S. PATENT DOCUMENTS

| | | | | |
|---|---|---|---|---|
| 5,237,587 A * | 8/1993 | Schoolcraft | ................... | 375/150 |
| 5,675,608 A * | 10/1997 | Kim et al. | ................... | 375/145 |
| 5,768,306 A * | 6/1998 | Sawahashi et al. | .......... | 375/150 |
| 5,949,817 A * | 9/1999 | Marshall | ...................... | 375/142 |
| 6,005,887 A * | 12/1999 | Bottomley et al. | .......... | 375/147 |
| 6,147,982 A * | 11/2000 | Sourour et al. | .............. | 370/324 |
| 6,289,041 B1 * | 9/2001 | Krasner | ....................... | 375/152 |
| 6,310,865 B1 * | 10/2001 | Ohki | .......................... | 370/311 |
| 6,693,890 B1 * | 2/2004 | Yick et al. | ................... | 370/342 |
| 7,076,015 B2 * | 7/2006 | Bhatoolaul et al. | .......... | 375/365 |
| 7,103,339 B2 | 9/2006 | Sternberg | ................... | 455/264 |
| 7,194,011 B1 * | 3/2007 | Nassiri-Toussi et al. | ..... | 370/503 |

(Continued)

FOREIGN PATENT DOCUMENTS

DE 10245039 A1 5/2004

(Continued)

OTHER PUBLICATIONS

Kay "Fundamentals of Statistical Signal Processing: Detection Theory" Prentice Hall, vol. II (pp. 169-176), 1998.

(Continued)

*Primary Examiner*—Emmanuel Bayard
(74) *Attorney, Agent, or Firm*—Dicke, Billig & Czaja, PLLC (57) ABSTRACT

A device (10) for preamble detection and frame synchronization, wherein data packets are transmitted by radio between transmitter and receiver and the data packets are in each case preceded by a known preamble with a sequence of preamble sections (B), with a correlator unit (20) for correlating samples ($r_n$) with a preamble section (B), an accumulator unit (23) for accumulating correlation results, and a detector unit (24) for detecting a received preamble by a comparison of the accumulation result with a threshold value.

21 Claims, 4 Drawing Sheets

U.S. PATENT DOCUMENTS

2002/0031170 A1* 3/2002 Yoon .......................... 375/140
2003/0099314 A1 5/2003 Gummadi et al. ........... 375/343

FOREIGN PATENT DOCUMENTS

EP  1041790 A2  10/2000
EP  1414208 A1  4/2004
WO  2004030302 A1  4/2004

OTHER PUBLICATIONS

Fechtel "Initial Burst Synchronization for WLAN: Preamble Detection, Timing and Frequency Acquisition" Infineon Technologies (pp. 1-28), Oct. 11, 2002.

International Search Report and Written Opinion for International Application No. PCT/DE2005/000870 (34 pages), Oct. 6, 2005.

* cited by examiner

DEVICE AND METHOD FOR PREAMBLE DETECTION AND FRAME SYNCHRONIZATION IN DATA PACKET TRANSMISSION

CROSS-REFERENCE TO RELATED APPLICATION

This application is a continuation of co-pending International Application No. PCT/DE2005/000870 filed May 11, 2005, which designates the United States, and claims priority to German application number DE 10 2004 025 109.6 filed May 21, 2004.

TECHNICAL FIELD

The invention relates to a device and to a method by means of which a preamble of a data packet received by a radio can be detected. In particular, the device and the method are designed for synchronizing a receiver with a frame structure of a radio signal received from a transmitter.

BACKGROUND

In packet transmission systems such as, for example, WLAN, the payload data of a data packet are preceded by a known preamble in order to support the acquisition at the receiver end. The data packets have different lengths and can arrive at the receiver at times which are not or only inaccurately known. For this reason, the receiver must first perform an acquisition in which, among other things, the preamble, and thus the reception of a data packet, are detected and then the accurate position of the preamble in time and thus the position of the subsequent payload data in time are determined.

In preamble detection and frame synchronization (time synchronization), the uncertainty about the time of arrival of a data packet at the receiver end and the characteristics of the transmission channel present problems. Furthermore, the transmission protocol often requires fast preamble detection such as, for example, in WLAN 802.11 a/g standard in which the preamble detection must have taken place within 4 µs after the beginning of the data packet.

Furthermore, preamble detection and frame synchronization are rendered more difficult by the situations listed below:

The multipath channel h=[h(−L1) ... h(0) ... h(+L2)] with the time-variant channel coefficients h(i) is unknown. Furthermore, the multipath profile $E[|h(i)|^2]$ and the length L=L1+L2 of the multipath channel are also unknown.

The payload and noise signal levels and, as a consequence, the signal-to-noise ratio are also unknown.

The front end exerts unknown influences at the beginning of the data packet reception. In particular, the RSSI (radio signal strength indicator), AGC (automatic gain control) and VCO (voltage controlled oscillator) units cause signal level, frequency and phase transients and an unknown frequency offset, as a result of which a part of the preamble cannot be detected and the first samples can be greatly distorted.

The preamble has a disadvantageous structure which impairs the determination of the accurate position of the data packet in time. For example, the preamble in the WLAN 11a standard has the structure [B B B B B B B B B B C1 C2 C1 C2 C1]. This preamble contains 10 B segments with a respective duration of 0.8 µs and a length of 16 preamble symbols and 5 C segments with a respective duration of 1.6 µs and a length of 32 preamble symbols. The beginning of the preamble, and thus also the beginning of the payload data, can only be determined by searching for the transition from the B segments to the C segments.

Preamble detection and frame synchronization has hitherto been based on the autocorrelation of periodic signal sections. In this process, use is made of the fact that, although periodic signals are distorted by the aforementioned influences, they remain periodic at the transitions apart from phase rotations and transients.

Figure 1:
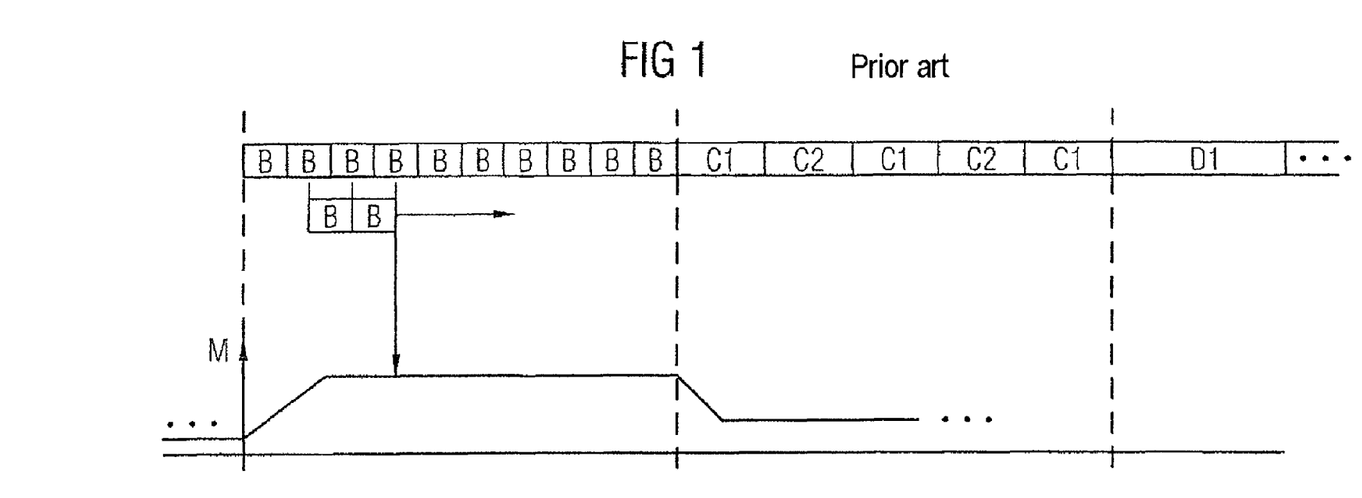
FIG. 1 shows a diagram for illustrating a metric according to conventional autocorrelation.

During the autocorrelation of two successive signal sections with a known period length, a flat peak of the metrics is obtained at the output of the correlator whenever the correlator exclusively correlates samples of the wanted preamble with one another. To illustrate this situation, FIG. 1 shows a data packet with a preamble consisting of B, C1, and C2 segments. The metrics M resulting from the autocorrelation are also shown.

After the autocorrelation of the samples, the resultant signal is usually subjected to postprocessing such as, for example, threshold detection and consistency checks in order to increase the probability of detection and, at the same time, to keep down the false alarm rate.

One disadvantage of preamble detection by autocorrelation is a high latency since the peak of the metrics at the correlator output is only reached after two period lengths. A further disadvantage of the autocorrelation is the fact that frame synchronization is only inaccurate since the metrics can recognize only soft transition at the B-C transition. Furthermore, the autocorrelation is susceptible to interference from unwanted signals which have a similar period length to the wanted preamble.

Hitherto, no devices based on the principle of optimum detection of a known signal in the noise when the signal has passed through an unknown multipath fading channel has been used for preamble detection and frame synchronization. Such optimum detectors are described in the book "Statistical Signal Processing—Vol. II: Detection Theory" by S. M. Kay, published by Prentice-Hall, 1998.

An optimum detector consists of a RAKE receiver having a number of RAKE fingers. Each RAKE finger determines the energy proportion of a transmission path. For this purpose, each RAKE finger contains a cross correlator and a noncoherent detector. The RAKE components are weighted, added together and then supplied to a threshold detector. As a result, an optimum detector in each case calculates metrics for the hypothesis according to which the wanted signal was received, and a hypothesis for the fact that the wanted signal was not received. Following this, a threshold decision is carried out. However, optimum detection is only possible theoretically under the following boundary conditions:

The multipath profile $E[|h(i)|^2]$, the length L and the noise level are known.

The front end does not exert any influences on the preamble detection. In particular, there are no phase transients due to VCO settling and frequency offset.

The received signal is available over the entire length of the wanted preamble.

The time pattern of the wanted preamble is known, i.e. certain starting times are predetermined such as, for example, in the case of time slots in TDMA-based mobile radio systems.

The boundary conditions listed above are not met due to the aggravating situations listed above and the demand for fast preamble detection. In detail, the multipath profile and the signal-to-noise ratio are not precisely known, the front end generates strong phase transients, the available signal spacing for the fast preamble detection is only short and the times at which data packets arrive are completely unknown. For these reasons, optimum detectors have hitherto not been used for preamble detection and frame synchronization.

SUMMARY

A device for preamble detection and particularly for synchronizing a receiver with a frame structure of a radio signal received from a transmitter, wherein data packets are transmitted by radio between the transmitter and the receiver and the device receives samples of the received radio signals and the data packets are in each case preceded by a known preamble, wherein the preamble has a sequence of identical first preamble sections and the first preamble sections in each case have a sequence of preamble symbols, may comprise a first correlator unit for correlating samples with the preamble symbol sequence of the first preamble section, a first accumulator unit for accumulating values which are based on the first correlation results generated by the first correlator unit, and a first detector unit for detecting a received preamble by means of a first comparison of a first metric generated by the first accumulator unit with a first threshold value, wherein a first averaging unit for averaging first correlation results is connected between the first correlator unit and the first accumulator unit, and wherein the first averaging unit is constructed in such a manner that it forms a first mean value over a predetermined number of successive first correlation results.

BRIEF DESCRIPTION OF THE DRAWINGS

In the text which follows, the invention will be explained in greater detail in an exemplary manner, referring to the drawings, in which.

DETAILED DESCRIPTION

In particular, the device according to an embodiment can be designed for synchronizing a receiver with a frame structure of a radio signal received from a transmitter. In this case, the device should provide for more exact frame synchronization. Furthermore, in an embodiment, a method for operating the device and a further method, corresponding to the device, for preamble detection and, in particular, for frame synchronization is specified.

An essential concept according to the disclosed embodiments consists in using a quasi-optimum detection for the preamble detection and, particularly, for the frame synchronization. I.e. an optimum detector is modified in such a manner that not all the abovementioned boundary conditions which are the prerequisite for a full-value optimum detection must be met for operating this quasi-optimum detector.

In the device according to an embodiment, it is assumed that data packets which are in each case preceded by a preamble are transmitted by radio between a transmitter and a receiver. The preamble contains a sequence of identical first preamble sections (or preamble segments, respectively) which are in each case composed of an identical sequence of preamble symbols. The preamble is completely known in the receiver.

To be able to perform preamble detection, the device according to an embodiment comprises a first correlator unit, a first accumulator unit and a first detector unit.

The first correlator unit receives samples of the radio signals received by the receiver and correlates these with the known preamble symbol sequence of the first preamble section.

The first correlation results output by the first correlator unit are processed further, if necessary, and then supplied to the first accumulator unit which generates a first metric by accumulating the values supplied to it.

The first detector unit performs a comparison of the first metric with a first threshold value. This comparison can be used to determine whether the preamble has been received by the receiver.

In the device according to an embodiment, no autocorrelation is performed as in conventional devices used for the same purpose, but a cross correlation of the samples of the received radio signals with the known preamble symbols is performed as in an optimum detector. In contrast to an optimum detector, the cross correlation is not performed over the entire preamble but, according to an embodiment, correlation is only performed over the length of a first preamble section and the resultant correlation result is then used for an accumulation. Accordingly, the operation of the device according to an embodiment does not absolutely require the availability of the entire length of the wanted preamble.

Since, according to an embodiment, information about whether a data packet with the wanted preamble has been received in the receiver can already be provided after the period of a first preamble section, the latency time is shortened according to an embodiment. This is because, in conventional autocorrelation, correlation must be performed over at least two first preamble sections before such information can be provided.

A further distinction of the device according to an embodiment compared with a conventional optimum detector is that the parallel-processing RAKE structure as is used in a conventional optimum detector has been eliminated. Instead of the correlations previously performed in the parallel-connected RAKE fingers, the samples are now processed serially in the first correlator unit.

As a result, said modifications of the optimum detector lead to the device according to an embodiment being able to be used as quasi-optimum detector for preamble detection and, in addition, unwanted interference signals are suppressed better than by previously known devices based on autocorrelation methods.

According to an embodiment, the first correlator unit can be followed by a first averaging unit. The first averaging unit forms a first mean value of the first correlation results and to be precise over a predetermined number of successive first correlation results.

The averaging over a number of successive first correlation results takes into consideration different propagation paths of the radio transmission. This task is handled by the RAKE fingers in a conventional optimum detector. In consequence, said measure contributes to a simplification of the device. Furthermore, the number of multipath paths looked at can be reduced in the device according to an embodiment in comparison with a conventional optimum detector.

Furthermore, a first absolute-value-generating unit is advantageously connected between the first correlator unit and the first averaging unit. The first absolute-value-generating unit generates the respective absolute values from the first correlation results. Due to this measure, the effects caused by phase transients are suppressed.

According to a further advantageous embodiment of the device, the preamble detection can be performed at two different speeds. A fast preamble detection is used for the early sensing of a data packet. A slow preamble detection supplies a more reliable result than the fast preamble detection. If the slow preamble detection is carried out following the fast preamble detection, the result determined by means of the fast preamble detection can either be confirmed or discarded by the slow preamble detection.

An embodiment of the device can be used for frame synchronization of the receiver with the frame structure of the radio signal received from the transmitter. For this purpose, it is provided that the preamble, apart from the first preamble sections, contains at least one second preamble section and that the at least one second preamble section, in turn, is constructed from a sequence of preamble symbols. Furthermore, the device according to an embodiment may comprise a second correlator unit, a second accumulator unit and a second detector unit.

The second correlator unit correlates the samples of the received radio signals with the known preamble symbol sequence of the second preamble section. After correlation has been carried out over the length of the second preamble section, the resultant second correlation result is processed further, if necessary, and then supplied to the second accumulator unit. The second accumulator unit is also supplied with values which are based on the first correlation results. The second accumulator unit generates a second metric by accumulating the values supplied to it. The second metric is compared with a second threshold value by the second detector unit. Such comparisons can be used for locating the beginning of the frame of the radio signal.

Due to the expansion of the device according to an embodiment by the processing path described above, a more precise frame synchronization than hitherto possible can be performed. The reason for this is that the second metric has distinct peaks at the transitions between the first and the second preamble sections.

Furthermore, it can be advantageously provided that the preamble has at least one third preamble section consisting of a preamble symbol sequence. A third correlator unit generates third correlation results by correlating samples with the preamble symbol sequence of the third preamble section. In this advantageous embodiment, the second accumulator unit, when forming the second metric, additionally takes into consideration values which are based on the third correlation results. Including the third preamble section increases the accuracy of the frame synchronization.

The first, second and possibly third correlator unit can be connected in parallel so that these correlator units are fed by the same samples at one time. This measure guarantees the fastest possible frame synchronization.

To provide for serial processing of the samples, the first correlator unit and/or the second correlator unit and/or the third correlator unit are in each case advantageously constructed in the form of a FIR (finite impulse response) filter.

According to a further advantageous embodiment of the device, averaging units are connected between the second correlator unit and the second accumulator unit and between the third correlator unit and the second accumulator unit, respectively. The averaging units in each case form a mean value over a predetermined number of successive second and third correlation results, respectively.

For the further suppression of the effects generated by phase transients, absolute-value-generating units advantageously follow the second correlator unit and/or the third correlator unit.

A first method according to an embodiment is used for operating the device. In a first method step, the first correlator unit, the first accumulator unit and the first detector unit are operated in a first operating mode. The first operating mode is distinguished by fast preamble detection. As a consequence, first information about the presence of a preamble can be provided within a short time. However, the reliability of this information is small due to the fast measurement. For this reason, a second operating mode which is characterized by slow preamble detection is activated in a second method step. Changing into the second operating mode is carried out in dependence on the first comparison. This means, for example, that changing into the second operating mode occurs as soon as a preamble has been detected with a certain probability during the fast preamble detection.

Furthermore, it can be advantageously provided that a change from the second operating mode into a third operating mode is carried out, when it has been confirmed in the second method step that a preamble has been detected. The frame synchronization is carried out in the third operating mode.

A second method according to an embodiment can be used for detecting a received preamble. For this purpose, the subsequent method steps are performed:

(a) correlating samples with the preamble symbol sequence of the first preamble section;
(b) accumulating values which are based on the first correlation results generated in step (a); and
(c) detecting a received preamble by means of a first comparison of a first metric generated in step (b) with a first threshold value.

The second method according to an embodiment has the same advantages as the device compared with conventional methods used for the same purpose.

Figure 2:
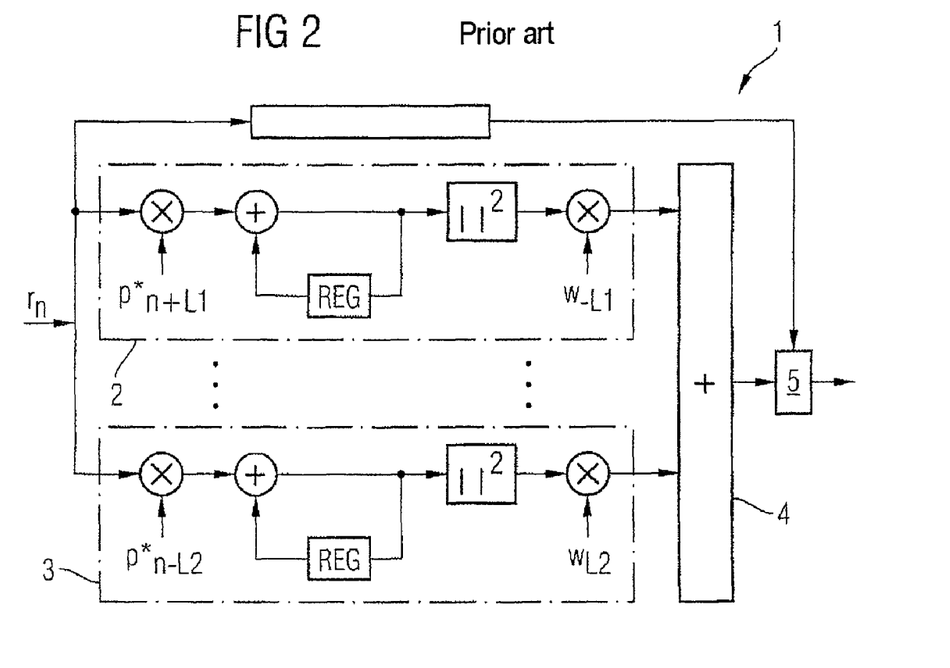
FIG. 2 shows a block diagram of a conventional optimum detector.

FIG. 2 shows the block diagram of a conventional optimum detector 1. The optimum detector 1 essentially consists of a RAKE receiver with L=L1+L2 parallel-connected RAKE fingers, of which RAKE fingers 2 and 3 are shown by way of example in FIG. 2. All RAKE fingers are of identical structure. At the input end, they have a cross correlator which is followed by an accumulator, an absolute-value-generating unit and a multiplier.

The RAKE fingers are fed by the front end with samples $r_n$ of the received radio signals. In each RAKE finger, the samples $r_n$ are first subjected to cross correlation. In this process, the incoming samples $r_n$ are successively multiplied by the complex conjugated symbols $p_n^*$ of a known sequence. To each RAKE finger, another sequence element of the known sequence is assigned as starting value for the multiplications.

The results of the respective correlations are added together with the aid of the accumulators in the RAKE fingers. After that, the absolute values of the individual accumulation results are determined. Before the output values of the RAKE fingers are added together by means of an adder 4, the output signal of each RAKE finger is also weighted with a Wiener weighting factor w.

The adder 4 is followed by a threshold detector 5. The threshold detector 5 compares the value obtained from the adder 4 with a predetermined threshold value. Using this comparison, the threshold detector 5 provides information about whether the known sequence is contained in the received radio signal.

Figure 3:
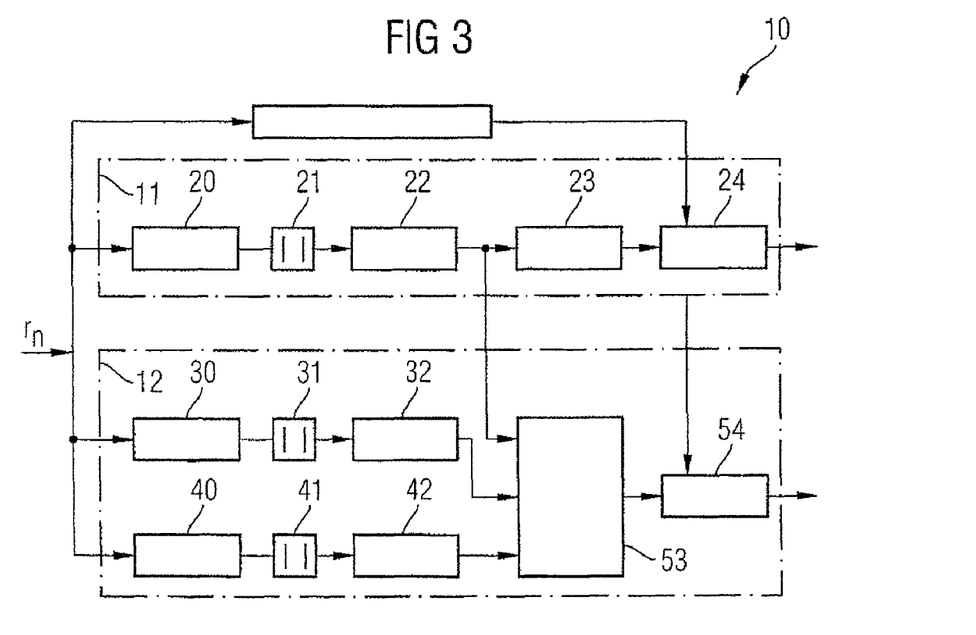
FIG. 3 shows a block diagram of a circuit arrangement for preamble detection and frame synchronization as an exemplary embodiment of the device.

FIG. 3 as an exemplary embodiment of the device shows a block diagram of a circuit arrangement 10 which is designed for preamble detection and frame synchronization. Although the circuit arrangement 10 is based on the principle of the optimum detector 1 shown in FIG. 2, it is modified in such a manner that it can be used for performing preamble detections and frame synchronizations. In the present exemplary embodiment, the radio transmission between transmitter and receiver is based on the WLAN standard. Accordingly, the preamble at the beginning of each data packet has the form shown in FIG. 1.

The circuit arrangement 10 contains various processing paths for the purpose of preamble detection and frame synchronization. Thus, the processing path 11 is used for preamble detection whereas the processing path 12 is designed for frame synchronization.

In the processing path 11, a correlator 20, an absolute-value-generating unit 21, an averaging unit 22, an accumulator 23 and a threshold detector 24 are connected in series in the order specified.

The correlator 20 is used for cross correlating the samples $r_n$ of the received radio signals, received in the circuit arrangement 10, with the known symbols of the B segment of the preamble shown in FIG. 1. The absolute value of the output values of the cross correlator 20 is determined by the absolute-value-generating unit 21. The absolute values determined are subjected to averaging in the averaging unit 22. In this process, it is specified over how many output values a mean value is formed. Following this, the mean values are added together in the accumulator 23. The resultant metric is compared with a predetermined threshold value by the threshold detector 24. From the output signal of the threshold detector 24 it can be seen whether the B segments, and thus the preamble, have been received.

In the processing path 12, a correlator 30, an absolute-value-generating unit 31 and an averaging unit 32 are connected in series. The same applies to a correlator 40, an absolute-value-generating unit 41 and an averaging unit 42. The outputs of the averaging units 22, 32 and 42 are connected to the inputs of a metric processor 53 which is followed by a threshold detector 54.

The correlators 30 and 40 are fed with the samples $r_n$ of the received radio signals. The correlators 30 and 40 and the absolute-value-generating units 31 and 41 and the averaging units 32 and 42 operate exactly like the corresponding units of the processing path 11, already described above. The decisive difference between the processing paths 11 and 12 consists in the different correlation coefficients. This is because the correlators 30 and 40 correlate the samples $r_n$ with the symbols of the preamble segment C1. Since the C1 segment is composed of the subsegments C1a and C1b, the correlator 30 uses the symbols of the subsegment C1a as correlation coefficients whereas the correlator 40 uses the symbols of the subsegment C1b for this purpose.

The metric processor 53 receives the averaged correlation results of all processing paths and determines from these, by accumulation, a metric which is compared with a predetermined threshold value by the threshold detector 54. The results of such comparisons can be used for determining the position of the transition between the last B segment and the first C1 segment of a preamble. As soon as this transition has been determined, the receiver knows the exact position of the received data packet.

Figure 4:
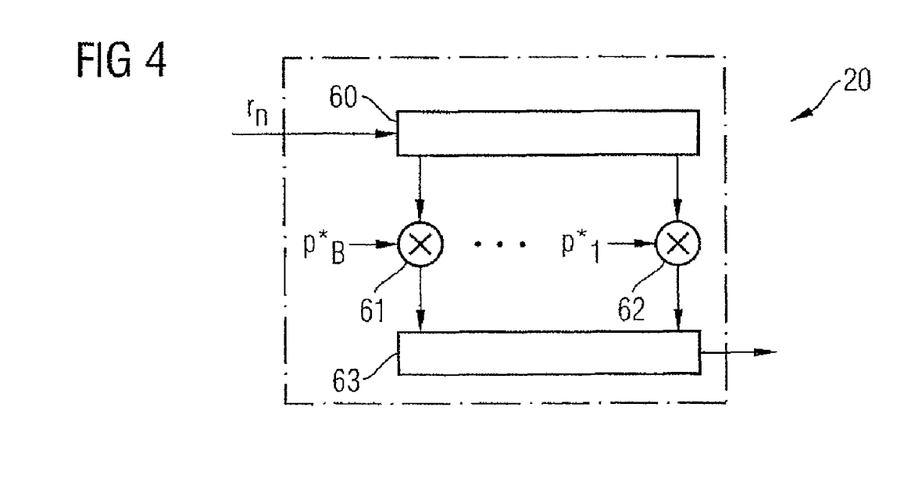
FIG. 4 shows a block diagram of a correlator constructed as FIR filter.

FIG. 4 shows a FIR filter as possible implementation of the correlator 20. The correlators 30 and 40 can be correspondingly constructed. To be able to be used as cross correlator, the known symbols of the B segment are used as filter coefficients of the FIR filter 20. The filter coefficients are permanently set. The samples $r_n$, are first input into a delay chain 60 from which they are forwarded with corresponding delays to multipliers, the multipliers 61 and 62 of which are shown by way of example in FIG. 4. Each multiplier multiplies the samples $r_n$ in each case with a fixed predetermined complex conjugated symbol of the B segment. The multiplication results obtained therefrom are added together by an adder 63.

Figure 5:
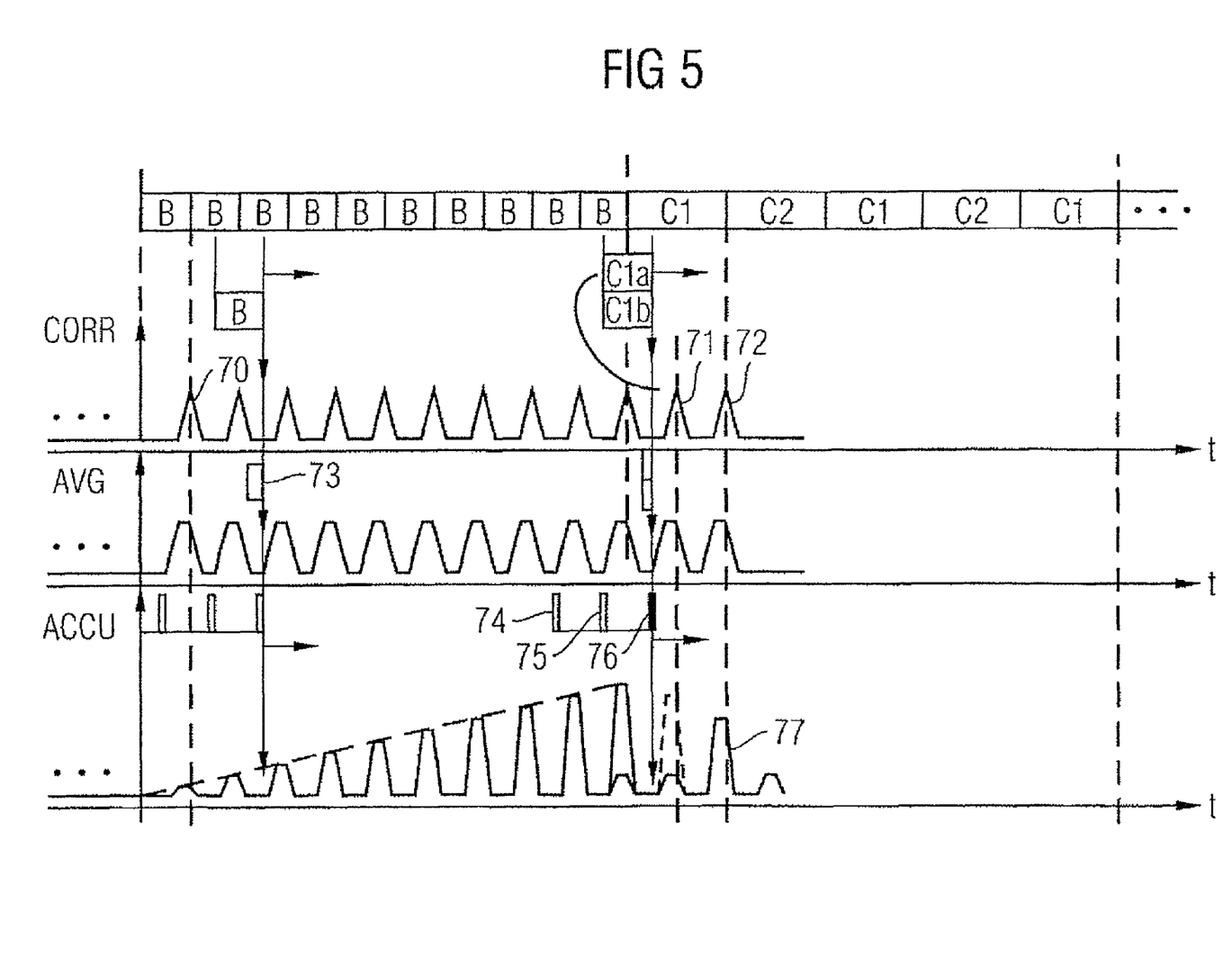
FIG. 5 shows a diagram for illustrating an exemplary embodiment of the method for preamble detection and frame synchronization.

FIG. 5 diagrammatically shows the mode of operation of the circuit arrangement 10 shown in FIG. 3. In addition, the diagram of FIG. 5 can be used for explaining an exemplary embodiment of the method for preamble detection and frame synchronization.

In the topmost first line of FIG. 5, the front part of a received data packet is shown which is available in sampled form. The data packet is composed of the B, C1 and C2 segments of the preamble and the payload data arranged behind them.

In the second line of FIG. 5, the output signals CORR of the correlators 20, 30 and 40 are plotted against the time t. The peaks of the output signals CORR show which preamble segment is detected at what time.

According to the position of the received data packet shown in FIG. 5, the samples $r_n$, of the received B segments are detected first. A peak 70 of the output signal CORR of the correlator 20 is obtained as soon as the FIR filter 20 shown in FIG. 4 is completely filled with the samples $r_n$, of a B segment.

In parallel with the correlation of the samples $r_n$ with the symbols of the B segment, the symbols of the C1a and of the C1b subsegment are also correlated with the samples $r_n$. At the beginning, this does not result in any peaks since the samples rn, are only based on received B segments. The first peak which can be observed at the output of the correlator 30 is the peak 71 drawn in FIG. 5. The first peak at the output of the correlator 40 is the peak 72.

In the third line of FIG. 5, the averaging over the individual output signals CORR is shown. To generate the mean values AVG, averaging is in each case performed over a predetermined number of samples rn. In FIG. 5, the time interval over which averaging is performed is illustrated by the width of the rectangle 73.

In the fourth line of FIG. 5, the output signals ACCU of the accumulator 23 and of the metric processor 53, respectively, are drawn.

The accumulator 23 adds together the mean values AVG generated by the averaging unit 22. This results in the rising line which is placed over the peaks of the output signal ACCU in the fourth line of FIG. 5. Such a rise in the peaks of the output signal ACCU generated by the accumulator 23 shows that B segments of the preamble have been received. A threshold detection performed for this purpose can be designed, for example, in such a manner that the detection of a preamble is indicated as soon as the output signal ACCU generated by the accumulator 23 exceeds a predetermined value for the first time.

Furthermore, the mode of operation of the metric processor 53 is also illustrated in the fourth line of FIG. 5. The metric processor 53 accumulates the mean values AVG provided by the averaging units 22, 32 and 42. In the present exemplary embodiment, the individual mean values AVG of the averaging units 22, 32 and 42 are in each case added together with a time offset of in each case the length of a B segment. This relationship is illustrated by the rectangle 74, 75 and 76 in FIG. 5. During the period reproduced by the width of the rectangle 74, the mean values AVG output by the averaging unit 22 are accumulated. This correspondingly applies to the rectangle 75 and the mean values AVG generated by the averaging unit 32 and to the rectangle 76 and the mean values AVG generated by the averaging unit 42.

As a result, the metric processor 53 supplies an output signal ACCU, of which a section provided with the reference symbol 77 is reproduced in FIG. 5. As long as only correlation results based only on samples $r_n$, of B segments enter the metric processor 53, only small peaks are obtained as output signal ACCU. These peaks are based on the accumulation of the mean values AVG provided by the averaging unit 22. However, as soon as correlation results based on samples $r_n$ of the received C1a and C1b subsegments also contribute to the accumulation for the first time, the peak of the output signal ACCU of the metric processor 53, which can be seen in FIG. 5, is obtained. This peak is reached precisely at the time at which the peaks 71 and 72 of the output signal CORR of the correlators 30 and 40 contribute to the output signal ACCU. After the described peak is reached, no more samples $rn$, based on a B segment enter the correlator 20 so that the output signal ACCU drops back to a smaller value again.

The peak of the output signal ACCU of the metric processor 53 described can be used for inferring the transition between the received B segments and the first C1 segment. For example, a threshold detection can be performed for this purpose which indicates that the output signal ACCU of the metric processor 53 has exceeded a predetermined threshold value.

In the text which follows, an exemplary embodiment of the method for operating the device is described. This exemplary embodiment refers to the circuit arrangement 10 shown in FIG. 3.

It is assumed that the circuit arrangement 10 is first in a standby mode. As soon as the circuit arrangement 1 receives a trigger signal from the outside, for example from the RSSI unit, it changes from the standby mode into the operating mode "preamble detection" and activates the components of the processing path 11 which are needed for preamble detection.

As soon as the output signal ACCU of the accumulator 23 meets a particular criterion, the circuit arrangement 10 starts a fast preamble detection. The criterion can consist, for example, in that the peaks of the output signal ACCU exceed a predetermined first threshold for the first time.

If, in fast preamble detection, the peaks of the output signal ACCU of the accumulator 23 exceed a predetermined second threshold value for the first time, which, for example, can be higher than the first threshold value, a slow preamble detection is performed instead of the fast one. In comparison with the fast preamble detection, the slow preamble detection is distinguished by higher reliability.

If, however, the second threshold value is not reached by the output signal ACCU within a predetermined period during the fast preamble detection, false detection is declared and the circuit arrangement returns into the "preamble detection" operating mode or into the standby mode.

After conclusion of the slow preamble detection, the circuit arrangement 10 changes into the "frame synchronization" operating mode. In this operating mode, the components of the processing path 12 are also activated in addition to the components of the processing path 11. As soon as the output signal ACCU of the metric processor 53 exceeds a predetermined third threshold value for the first time in this operating mode, the position of the B-C1 transition is found. Before the circuit arrangement 10 returns into the standby mode again after that, a successful frame synchronization is declared and further processing of the received data packet is triggered. If, however, the third threshold value is not reached by the output signal ACCU within a predetermined period, false detection is declared and the circuit arrangement returns into the "preamble detection" operating mode or into the standby mode.

In the method described above, it is appropriate to design the first, second and third threshold values in each case within wide limits, with small step lengths and programmable independently of one another.

Figure 6:
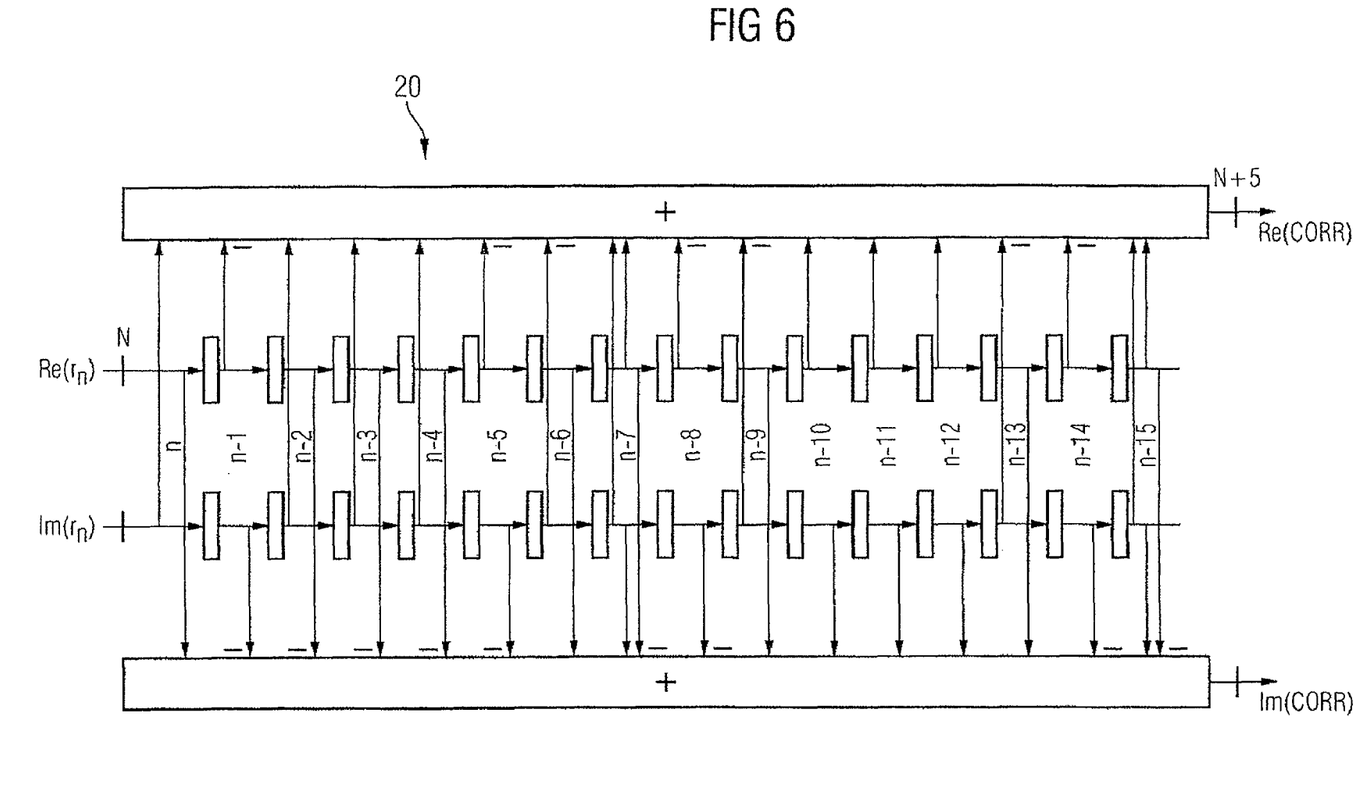
FIG. 6 shows a block diagram of an implementation of the correlator constructed as FIR filter.

FIG. 6 shows the block diagram of a possible implementation of the FIR filter 20. The correlators 30 and 40 can be constructed similarly.

In the present exemplary embodiment, the filter coefficients of the FIR filter 20 which are the complex conjugated symbols of the B segment have been mapped onto the very simple symbols $\{1, 0, 1\}+j*\{-1, 0, 1\}$. This simplification does not lead to any significant losses but it reduces the filtering to a number of additions. Due to this simplification, the FIR filter 20 can be implemented by two rows of series-connected registers, the registers being connected to two adders in accordance with the calculated additions. The adders generate the real and imaginary part of the output signal CORR at their outputs. The averaging units 22, 32 and 42 shown in FIG. 3 can also be simplified by constructing them in such a manner that they only add together a predetermined number of successive correlation values. Furthermore, it can be provided that the averaging units 22, 32 and 42 apply an, in particular, fixed weighting factor, for example 1, ½, ¼ to the correlation values. In particular, both the number of correlation values added together and the weighting factor can be designed to be programmable.

In the accumulator 23, the depth of accumulation in time should be limited by weighting with a so-called "forgetting factor" in order to avoid a numerical overflow with continuous operation.

In the case of OFDM modulation (WLAN), the position determined by the frame synchronization can be advantageously corrected. Using a fixed displacement parameter (timing headroom), the FFT window can be arranged in such a manner that the precursors and trailers of the channel impulse response fall into the center of the OFDM guard interval, if possible. The timing headroom can be programmable.

What is claimed is:

1. A device for preamble detection and particularly for synchronizing a receiver with a frame structure of a radio signal received from a transmitter, wherein data packets are transmitted by radio between the transmitter and the receiver and the device receives samples of the received radio signals and the data packets are in each case preceded by a known preamble, wherein the preamble has a sequence of identical first preamble sections and the first preamble sections in each case have a sequence of preamble symbols, the device comprising
a first correlator unit for correlating samples with the preamble symbol sequence of the first preamble section,
a first accumulator unit for accumulating values which are based on the first correlation results generated by the first correlator unit, and a first detector unit for detecting a received preamble by means of a first comparison of a first metric generated by the first accumulator unit with a first threshold value, wherein the device is constructed in such a manner that a preamble detection can be performed at two different speeds, wherein a slow preamble detection allows a more reliable preamble detection than a fast preamble detection, wherein the device is constructed for correlating only over the length of a first preamble section in the fast preamble detection and for correlating over a number of preamble sections in the slow preamble detection, wherein if, in the fast preamble detection, an output signal of the first accumulator unit exceeds a second threshold value the slow preamble detection is performed.

2. The device according to claim 1, wherein
the first correlator unit is followed by a first absolute-value-generating unit for generating the absolute value of the first correlation results.

3. A method for operating a device for preamble detection according to claim 1, comprising:
(a) operating the first correlator unit, the first accumulator unit and the first detector unit in a first operating mode with fast preamble detection, wherein correlation is performed only over the length of a first preamble section in the fast preamble detection; and
(b) changing into a second operating mode with slow preamble detection in dependence on the first comparison, wherein correlation is performed over a number of preamble sections in the slow preamble detection.

4. A device for preamble detection and particularly for synchronizing a receiver with a frame structure of a radio signal received from a transmitter, wherein data packets are transmitted by radio between the transmitter and the receiver and the device receives samples of the received radio signals and the data packets are in each case preceded by a known preamble, wherein the preamble has a sequence of identical first preamble sections and the first preamble sections in each case have a sequence of preamble symbols,
the device comprising:
a first correlator unit for correlating samples with the preamble symbol sequence of the first preamble sections,
a first accumulator unit for accumulating values which are based on the first correlation results generated by the first correlator unit, and
a first detector unit for detecting a received preamble by means of a first comparison of a first metric generated by the first accumulator unit with a first threshold value, wherein
the preamble has at least one second preamble section and the at least one second preamble section has a sequence of preamble symbols which is different from the sequence of preamble symbols of the first preamble sections, and wherein
the device also comprises:
a second correlator unit for correlating samples with the preamble symbol sequence of the at least one second preamble section,
a second accumulator unit for accumulating values which are based on the first correlation results and values which are based on the second correlation results generated by the second correlator unit, and
a second detector unit for detecting a beginning of a frame by means of a second comparison of a second metric generated by the second accumulator unit with a second threshold value.

5. The device according to claim 4, wherein
the first correlator unit is followed by a first absolute-value-generating unit for generating the absolute value of the first correlation results.

6. The device according to claim 4, wherein
the device is constructed in such a manner that a preamble detection can be performed at two different speeds, wherein a slow preamble detection allows a more reliable preamble detection than a fast preamble detection, wherein the device is constructed for correlating only over the length of a first preamble section in the fast preamble detection and for correlating over a number of preamble sections in the slow preamble detection.

7. The device according to claim 4, wherein
the preamble has at least one third preamble section and the at least one third preamble section has a sequence of preamble symbols,
the device also comprises a third correlator unit for correlating samples with the preamble symbol sequence of the at least one third preamble section, and
the second accumulator unit is constructed for accumulating values which are based on the first correlation results, and values which are based on the second correlation results, and values which are based on the third correlation results generated by the third correlator unit.

8. The device according to claim 4, wherein
the first, the second and possibly the third correlator unit are connected in parallel so that the correlator units perform the correlation of the same samples at one time.

9. The device according to claim 4, wherein
the first correlator unit and/or the second correlator unit and/or the third correlator unit are in each case constructed in the form of a FIR filter.

10. The device according to claim 4, wherein
a second averaging unit for averaging second correlation results is connected between the second correlator unit and the second accumulator unit, wherein the second averaging unit is constructed in such a manner that it forms a second mean value over a predetermined number of successive second correlation results, and/or
a third averaging unit for averaging third correlation results is connected between the third correlator unit and the second accumulator unit, wherein the third averaging unit is constructed in such a manner that it forms a third mean value over a predetermined number of successive third correlation results.

11. The device according to claim 4, wherein
a second absolute-value-generating unit for generating the absolute value of the second correlation results follows the second correlator unit, and/or
a third absolute-value-generating unit for generating the absolute value of the third correlation results follows the third correlator unit.

12. A method for operating a device for preamble detection according to claim 4, comprising:
(a) operating the first correlator unit, the first accumulator unit and the first detector unit in a first operating mode with fast preamble detection, wherein correlation is performed only over the length of a first preamble section in the fast preamble detection; and
(b) changing into a second operating mode with slow preamble detection in dependence on the first comparison, wherein correlation is performed over a number of preamble sections in the slow preamble detection.

13. The method according to claim 12, comprising
(c) performing a change from the second operating mode into a third operating mode in dependence on the first comparison, wherein the second correlator unit, the second accumulator unit and the second detector unit are operated in the third operating mode.

14. The method according to claim 13, wherein
the preamble has at least one third preamble section and the at least one third preamble section has a sequence of preamble symbols,
the device also comprises a third correlator unit for correlating samples with the preamble symbol sequence of the at least one third preamble section, and
the second accumulator unit is constructed for accumulating values which are based on the first correlation results, and values which are based on the second correlation results, and values which are based on the third correlation results generated by the third correlator unit, and wherein
the third correlator unit is additionally operated in the third operating mode.

15. The device of claim 4, wherein the first preamble sections have less preamble symbols than the second preamble section.

16. A method for preamble detection and particularly for synchronizing a receiver with a frame structure of a radio signal received from a transmitter, wherein
data packets are transmitted by radio between the transmitter and the receiver and the received radio signals are sampled, and
the data packets are in each case preceded by a known preamble, wherein the preamble has a sequence of identical first preamble sections and the first preamble sections in each case have a sequence of preamble symbols, the method comprising:
(a) correlating samples with the preamble symbol sequence of the first preamble section;
(b) accumulating values which are based on the first correlation results generated in step (a); and
(c) detecting a received preamble by means of a first comparison of a first metric generated in (b) with a first threshold value, wherein
the preamble detection is performed at two different speeds, wherein a slow preamble detection allows a more reliable preamble detection than a fast preamble detection, wherein correlation is performed only over the length of a first preamble section in the fast preamble detection and correlation is performed over a number of preamble sections in the slow preamble detection, wherein if in the fast preamble detection, the accumulated values exceed a second threshold value, the slow preamble detection is performed.

17. The method according to claim 16, wherein
after (a), the absolute value is formed from the first correlation results.

18. A method for preamble detection and particularly for synchronizing a receiver with a frame structure of a radio signal received from a transmitter, wherein
data packets are transmitted by radio between the transmitter and the receiver and the received radio signals are sampled, and
the data packets are in each case preceded by a known preamble, wherein the preamble has a sequence of identical first preamble sections and the first preamble sections in each case have a sequence of preamble symbols, the method comprising:
(a) correlating, with a first correlating unit of a device, samples with the preamble symbol sequence of the first preamble section;
(b) accumulating, with a first accumulative unit of the device, values which are based on the first correlation results generated in step (a); and
(c) detecting, with a first detection unit of the device, a received preamble by means of a first comparison of a first metric generated in (b) with a first threshold value, wherein
the preamble has at least one second preamble section and the at least one second preamble section has a sequence of preamble symbols which is different from the sequence of preamble symbols of the first preamble sections, and
wherein furthermore, the following steps are carried out:
(d) correlating, with a second correlator unit of the device, samples with the preamble symbol sequence of the at least one second preamble section;
(e) accumulating, with a second accumulation unit of the device values which are based on the first correlation results and values which are based on the second correlation results generated in (d); and
(f) detecting, with a second detection unit of the device, a beginning of a frame by means of a second comparison of a second metric generated in (e) with a second threshold value.

19. The method according to claim 18, wherein
after (a), the absolute value is formed from the first correlation results.

20. The method according to claim 18, wherein
the preamble detection is performed at two different speeds, wherein a slow preamble detection allows a more reliable preamble detection than a fast preamble detection, wherein correlation is performed only over the length of a first preamble section in the fast preamble detection and correlation is performed over a number of preamble sections in the slow preamble detection.

21. The method according to claim 18, wherein
the preamble has at least one third preamble section and the at least one third preamble section has a sequence of preamble symbols,
third correlation results are generated by correlating samples with the preamble symbol sequence of the at least one third preamble section, and
in (e), values based on the first correlation results and values based on the second correlation results and values based on the third correlation results are accumulated.

* * * * *